US012269083B2

(12) United States Patent
Akiyama

(10) Patent No.: US 12,269,083 B2
(45) Date of Patent: Apr. 8, 2025

(54) PRESS BRAKE AND BENDING METHOD

(71) Applicant: AMADA CO., LTD., Kanagawa (JP)

(72) Inventor: Shogo Akiyama, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 216 days.

(21) Appl. No.: 17/799,682

(22) PCT Filed: Feb. 10, 2021

(86) PCT No.: PCT/JP2021/004993
§ 371 (c)(1),
(2) Date: Aug. 14, 2022

(87) PCT Pub. No.: WO2021/166766
PCT Pub. Date: Aug. 26, 2021

(65) Prior Publication Data
US 2023/0083498 A1 Mar. 16, 2023

(30) Foreign Application Priority Data
Feb. 17, 2020 (JP) ................................ 2020-024127

(51) Int. Cl.
*B21D 5/02* (2006.01)
*B30B 15/00* (2006.01)
*B30B 15/04* (2006.01)

(52) U.S. Cl.
CPC .......... *B21D 5/0272* (2013.01); *B30B 15/007* (2013.01); *B30B 15/04* (2013.01)

(58) Field of Classification Search
CPC .......... B21D 5/01; B21D 5/02; B21D 5/0272; B30B 15/007; B30B 15/04
See application file for complete search history.

(56) References Cited

U.S. PATENT DOCUMENTS 6,374,658 B1 4/2002 Gascoin et al.
8,438,894 B2 * 5/2013 Hansen ................ B30B 15/007 72/482.3

(Continued)

FOREIGN PATENT DOCUMENTS

CN 101837393 A 9/2010
JP 2000-343125 A 12/2000

(Continued)

OTHER PUBLICATIONS

International Search Report for corresponding Application No. PCT/JP2021/004993, mailed Apr. 13, 2021.

(Continued)

*Primary Examiner* — Teresa M Ekiert
(74) *Attorney, Agent, or Firm* — Renner, Otto, Boisselle & Sklar, LLP

(57) ABSTRACT

A press brake is equipped with an upper table provided so as to be vertically movable at an upper part of a main frame and holding a punch tool on a lower side thereof, and a lower table provided at a lower part of the main frame and holding a die tool on an upper side thereof. A pair of slits extending symmetrically in a lateral direction are formed in the lower table, and an end portion of each slit on an outer side in the lateral direction is opened. An elastic member is provided in the end portion of each slit on the outer side in the lateral direction. The elastic member is configured to be switchable between a load-receiving state for receiving a bending load acting on the lower table and a released state in which the load-receiving state has been released.

6 Claims, 12 Drawing Sheets

(56) References Cited

U.S. PATENT DOCUMENTS

| | | | | |
|---|---|---|---|---|
| 9,089,888 | B2 * | 7/2015 | Patuzzi | B21D 5/0272 |
| 2010/0229622 | A1 | 9/2010 | Hansen | |

FOREIGN PATENT DOCUMENTS

| | | | |
|---|---|---|---|
| JP | 2001-71033 | A | 3/2001 |
| JP | 2010-228004 | A | 10/2010 |
| WO | 01/43896 | A1 | 6/2001 |

OTHER PUBLICATIONS

Written Opinion for corresponding Application No. PCT/JP2021/004993, mailed Apr. 13, 2021.

Search Report issued on Jul. 25, 2023 in the counterpart European application No. 21756210.7.

* cited by examiner

PRESS BRAKE AND BENDING METHOD

TECHNICAL FIELD

The present invention relates to a press brake for bending a workpiece (a sheet metal) and a bending method.

BACKGROUND ART

An upper table that holds a punch tool (an upper tool) is provided so as to be vertically movable at an upper part of a main frame in a press brake, and the upper table extends in the lateral direction. A pair of elevating cylinders that elevate the upper table are provided at the upper part of the main frame, and the pair of elevating cylinders are separated in the lateral direction. Further, a lower table that holds a die tool (a lower tool) is provided at a lower part of the main frame, and the lower table extends in the lateral direction.

After a workpiece is positioned in the front-rear direction with respect to the die tool, the upper table is lowered by driving the pair of elevating cylinders. The workpiece is bent by corporation between the punch tool and the die tool, which results in the workpiece bent and shaped at a predetermined angle.

When the workpiece is bent, a bending load (a bending pressurizing force) by the elevating cylinders acts on the both ends of the upper table, but due to the influence of a reaction force from the workpiece, a lower surface of the upper table is deflected in a concave shape and an upper surface of the lower table is also deflected in a concave shape. In such a case, a closing interval (a vertical interval) between the upper table and the lower table is not uniform along the lateral direction. As a result, if the bending length of the workpiece is slightly shorter than or substantially the same as the total length of the lower table, the bending angle will not be constant along the bending length direction of the workpiece. Then, the "longitudinal accuracy (a degree of accuracy of the bending angle in the bending length direction of the workpiece)" is decreased.

In order to suppress the decrease in the longitudinal accuracy of the bending, a press brake has been developed that includes a pair of slits formed in a lower table for controlling deflection of the lower table (see Patent Literatures 1 and 2 below). The pair of slits extending in the lateral direction are formed in the lower table. The outer end portion of each slit is opened on the side surface of the lower table. As a result, the upper surface of the lower table is deflected in a convex shape to reduce the change in the closing interval between the upper table and the lower table in the lateral direction, thereby making it possible to suppress the decrease in the longitudinal accuracy.

In the press brake disclosed in Patent Literature 1, fixed blocks for adjusting the deflection of the lower table are respectively provided in the pair of slits that are formed in the lower table and opened at the lower table side edge. Further, in the press brake disclosed in Patent Literature 2, a coil spring for adjusting the deflection of the lower table is fixedly provided at the open end of the pair of slits that are opened at the lower table side edge.

CITATION LIST

Patent Literature

Patent Literature 1: Japanese Patent Application Laid-Open Publication No. 2010-228004

Patent Literature 2: Japanese Patent Application Laid-Open Publication No. 2000-343125

SUMMARY

The deflection state (curving state) at the time of bending the upper and lower tables in the press brake disclosed in Patent Literature 1 is schematically shown in FIG. 1 (the upper and lower tables are shown in a separately). FIG. 1(*a*) shows the bending of a workpiece of a medium thickness plate, FIG. 1(*b*) shows the bending of a workpiece of a thin plate, and FIG. 1(*c*) shows the bending of a workpiece of a thick plate. In the drawings, "FF" indicates a forward direction, "FR" indicates a backward direction, "L" indicates a left direction, "R" indicates a right direction, "U" indicates an upward direction, and "D" indicates a downward direction.

In the press brake disclosed in Patent Literature 1, for example, when the medium thickness plate is bent, as shown in FIG. 1(*a*), the closing interval between an upper table T1 and a lower table T2 is adjusted to be constant by a fixed block in a slit. On the other hand, when the thin plate is bent, as shown in FIG. 1(*b*), the bending load (the bending pressurizing force) acting on the upper table T1 is small and the deflection of the central portion of the upper table T1 in the lateral direction is small. Further, since the bending load is small and the reaction force from the workpiece is also small because the thickness is thin, the deflection of the lower table T2 is slightly different from the deflection at the time of bending the medium thickness plate (only the both ends thereof are deflected until the block fixed in the slit starts to suppress the deflection at the both ends of the lower table T2). Therefore, the closing interval between the upper table T1 and the lower table T2 is increased on the outer side in the lateral direction. As a result, if the bending length is slightly shorter than or substantially the same as the total length of the lower table T2, the bending angle is increased at the both ends in the bending length direction and the bending angle is decreased at the center.

Further, when the thick plate is bent, as shown in FIG. 1(*c*), the bending load acting on the upper table T1 is large and the deflection of the central portion of the upper table T1 in the lateral direction is large. Further, since the bending load is large and the reaction force from the workpiece is also large because the thickness is thick, the deflection of the lower table T2 is slightly different from the deflection at the time of bending the medium thickness plate (the downward deflection at the both ends of the lower table T2 is decreased). Therefore, the closing interval between the upper table T1 and the lower table T2 is decreased on the outer side in the lateral direction. As a result, if the bending length is slightly shorter than or substantially the same as the total length of the lower table, the bending angle is decreased at the both ends in the bending length direction. In other words, in the press brake disclosed in Patent Literature 1, the longitudinal accuracy of the bending is not sufficiently improved regardless of the thickness of the workpiece.

On the other hand, as described above, in the press brake disclosed in Patent Literature 2, the coil spring is fixedly provided at the open end of the slit. In other words, the deflection of the lower table is adjusted by providing the coil spring instead of the fixed block in the slit of Patent Literature 1. However, the press brake disclosed in Patent Literature 2 still has the above problem in the same manner as in Patent Literature 1.

That is, in the press brakes disclosed in Patent Literatures 1 and 2, the longitudinal accuracy of the bending is not sufficiently improved regardless of the thickness of the workpiece.

An object of the present invention is to provide a press brake and a bending method capable of bringing a closing interval between an upper table and a lower table close to a substantially uniform state along the lateral direction regardless of a thickness of a workpiece.

A first aspect of the present invention is to provide a press brake, which is equipped with an upper table provided so as to be vertically movable at an upper part of a main frame and configured to hold a punch tool on a lower side thereof, a lower table provided at a lower part of the main frame and including a pair of slits formed therein, the pair of slits extending symmetrically in a lateral direction, an end portion of each of the slits on an outer side in the lateral direction being opened, the lower table being configured to hold a die tool on an upper side thereof, and an elastic member provided at the end portion of each of the slits on the outer side in the lateral direction and configured to be switchable between a load-receiving state for receiving a bending load acting on the lower table and a released state in which the load-receiving state is released.

A second aspect of the present invention is to provide a bending method for bending a workpiece by cooperation between a punch tool and a die tool with use of the press brake described above, the bending method including, when a workpiece of a thin plate having a thickness of less than 1.2 mm is bent, putting the elastic member into the load-receiving state and putting the movable block into the first load-receiving state, as necessary. The press brake used here is the press brake according to the first aspect described above, which is further equipped with a movable block provided on an inner portion of each of the slits and movable in the lateral direction, in which the movable block includes a pair of a first load-receiving surface and a second load-receiving surface lined in the lateral direction to receive the bending load, and the movable block is configured to be switchable between a first load-receiving state and a second load-receiving state, the first load-receiving surface vertically facing an inner surface of the slit with a first clearance in the first load-receiving state, the second load-receiving surface vertically facing the inner surface of the slit with a second clearance smaller than the first clearance in the second load-receiving state.

BRIEF DESCRIPTION OF DRAWINGS

FIG. 1(*a*) shows a case in which a medium thickness plate is bent, FIG. 1(*b*) shows a case in which a thin plate is bent, and FIG. 1(*c*) shows a case in which a thick plate is bent.

DESCRIPTION OF EMBODIMENTS

Hereinafter, a press brake 10 according to the embodiment will be described with reference to FIGS. 2 to 11.

Figure 2:
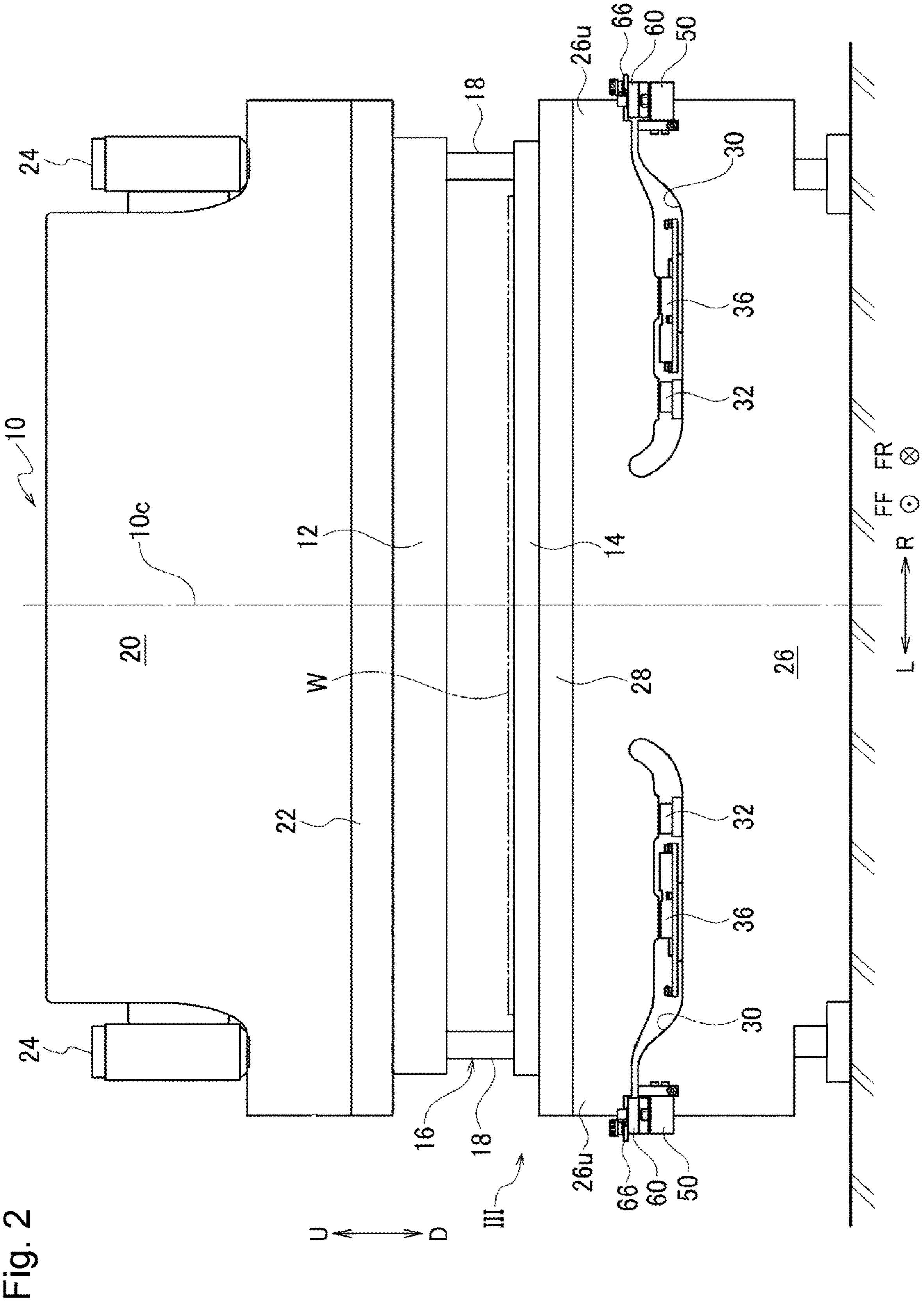
FIG. 2 is a schematic front view of the press brake according to the present embodiment.
Figure 3:
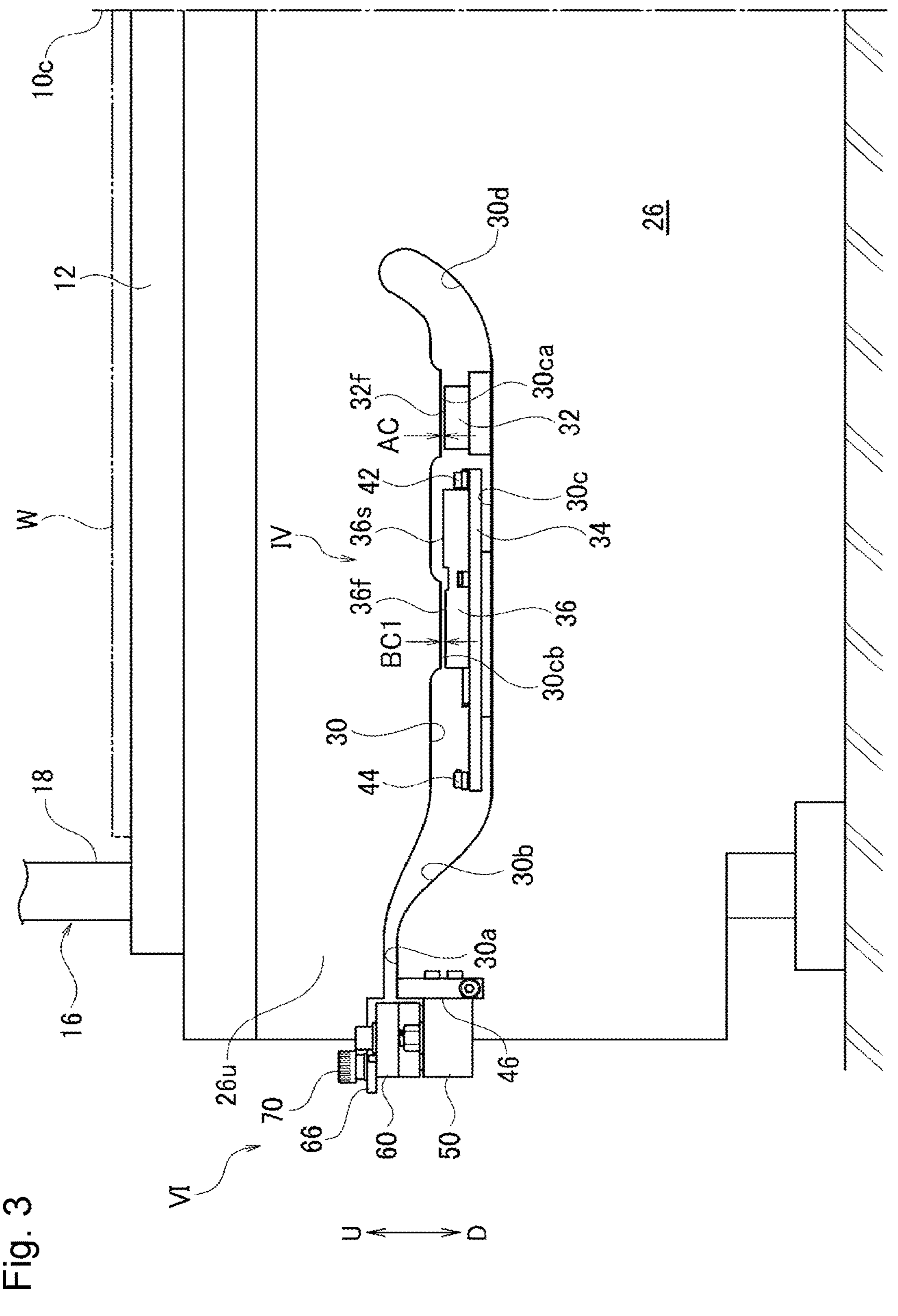
FIG. 3 is an enlarged view showing a III portion in FIG. 2.

As shown in FIG. 2, the press brake 10 is a sheet metal processing machine that bends a plate-shaped workpiece (a sheet metal) W by cooperation between a punch tool 12 and a die tool 14. Further, the press brake 10 is provided with a main frame 16. The main frame 16 includes a pair of side plates 18 that are separated and opposed to each other in the lateral direction, and a plurality of connecting members (not shown) that connect the pair of side plates 18.

An upper table 20 extending in the lateral direction is provided so as to be vertically movable at the upper part of the main frame 16. The upper table 20 holds the punch tool 12 on the lower side thereof so as to be able to be installed and removed via a punch holder 22 extending in the lateral direction. An elevating cylinder 24 is provided on the upper part of each side plate 18 as an elevating actuator for elevating the upper table 20. The pair of elevating cylinders 24 are separated from each other in the lateral direction. Further, a lower table 26 extending in the lateral direction is provided at the lower part of the main frame 16. The lower table 26 vertically faces the upper table 20. The lower table 26 holds the die tool 14 on the upper side thereof so as to be able to be installed and removed via a die holder 28 extending in the lateral direction. Note that instead of the hydraulic elevating cylinder 24, an elevating servomotor (not shown) may be used as the elevating actuator.

As shown in FIG. 2, in the lower table 26, a pair of slits 30 extending in the lateral direction are formed symmetrically with respect to a center 10*c* of the press brake 10 (the lower table 26). An end portion of each slit 30 on the outer side in the lateral direction is opened on the side surface of the lower table 26. The end portion on the inner side of the slit 30 in the lateral direction is terminated at the center portion of the lower table 26 in the lateral direction. The slit 30 facilitates deflection deformation on the outer side of the lower table 26 in the lateral direction. Hereinafter, only one of the pair of slits 30 will be described with reference to FIG. 3, but the other one is also formed symmetrically. The slit 30 includes an outer horizontal portion 30*a*, an outer inclined portion 30*b*, an inner horizontal portion 30*c*, and an inner inclined portion 30*d* from the outer side in the lateral direction. The outer horizontal portion 30*a* is formed substantially horizontally, and the height at the open end of the outer horizontal portion 30*a* is raised. The outer inclined portion 30*b* is inclined with respect to the horizon so as to be gradually lowered toward the inner side in the lateral direction. The inner horizontal portion 30*c* is formed substantially horizontally. The inner inclined portion 30*d* is inclined with respect to the horizon so as to be gradually raised toward the inner side in the lateral direction.

Note that the slit 30 is not limited to the one including the outer horizontal portion 30*a*, the outer inclined portion 30*b*, and the like, and the shape of the slit 30 can be changed as appropriate. For example, the inner inclined portion 30*d* may be omitted, or another horizontal portion (not shown) may be arranged on the inner side of the inner inclined portion 30*d* in the lateral direction.

A fixed block 32 that receives a bending load acting on an upper portion 26*u* above the slit 30 of the lower table 26 is provided on the lower inner wall of the inner horizontal portion 30*c* of the slit 30. The fixed block 32 includes a flat load-receiving surface 32*f* for receiving the bending load described above. The load-receiving surface 32*f* vertically faces a flat surface 30*ca* on the upper inner wall of the inner horizontal portion 30*c*. In the present embodiment, a clearance AC between the load-receiving surface 32*f* and the flat surface 30*ca* (a clearance of the fixed block 32) is set to be, for example, 0.1 mm.

As shown in FIGS. 3 to 5B, a support base 34 extending in the lateral direction is provided on the outer side of the fixed block 32 in the lateral direction on the lower inner wall of the inner horizontal portion 30*c*. A movable block 36 is provided on the support base 34 so as to be movable in the lateral direction via a slide rail 38. The movable block 36 receives the bending load acting on the upper portion 26*u*. In other words, the movable block 36 is provided on the outer side of the fixed block 32 in the lateral direction on the lower inner wall of the inner horizontal portion 30*c* so as to be movable in the lateral direction via the support base 34 and the slide rail 38. The slide rail 38 is arranged behind the movable block 36.

The movable block 36 includes a pair of flat load-receiving surfaces (a first load-receiving surface 36*f* and a second load-receiving surface 36*s*) for receiving the bending load acting on the upper portion 26*u*. The height of the first load-receiving surface 36*f* is set to be lower than the height of the second load-receiving surface 36*s*. The movable block 36 is configured to be switchable between a first load-receiving state and a second load-receiving state by the movement thereof in the lateral direction. The first load-receiving state is a state in which the first load-receiving surface 36*f* vertically faces the flat surface 30*cb* (see FIGS. 4(*a*) and 5A). In the first load-receiving state, a first clearance BC1 (a clearance of the movable block 36) is formed between the first load-receiving surface 36*f* and the flat surface 30*cb*. The second load-receiving state is a state in which the second load-receiving surface 36*s* vertically faces the flat surface 30*cb* (see FIGS. 4(*b*) and 5B). In the second load-receiving state, a second clearance BC2 is formed between the second load-receiving surface 36*s* and the flat surface 30*cb*.

In the present embodiment, the first clearance BC1 is set to be larger than the clearance AC of the fixed block 32 described above (for example, 0.7 mm). The second clearance BC2 is set to be larger than the clearance AC of the fixed block 32 and smaller than the first clearance BC1 (for example, 0.4 mm).

Note that the fixed block 32 may be provided on the upper inner wall of the inner horizontal portion 30*c* instead of the lower inner wall thereof. In this case, the fixed block 32 receives the bending load acting on the upper portion 26*u* relative to the lower table 26. The load-receiving surface 32*f* vertically faces a flat surface (not shown) of the lower inner wall of the inner horizontal portion 30*c*. In the same manner, the movable block 36 may also be provided on the upper inner wall of the inner horizontal portion 30*c* instead of the lower inner wall thereof. In this case, the movable block 36 receives the bending load acting on the upper portion 26*u* relative to the lower table 26. The load-receiving surfaces 36*f* and 36*s* of the movable block 36 vertically face a flat surface (not shown) of the lower inner wall of the inner horizontal portion 30*c*.

Figure 4:
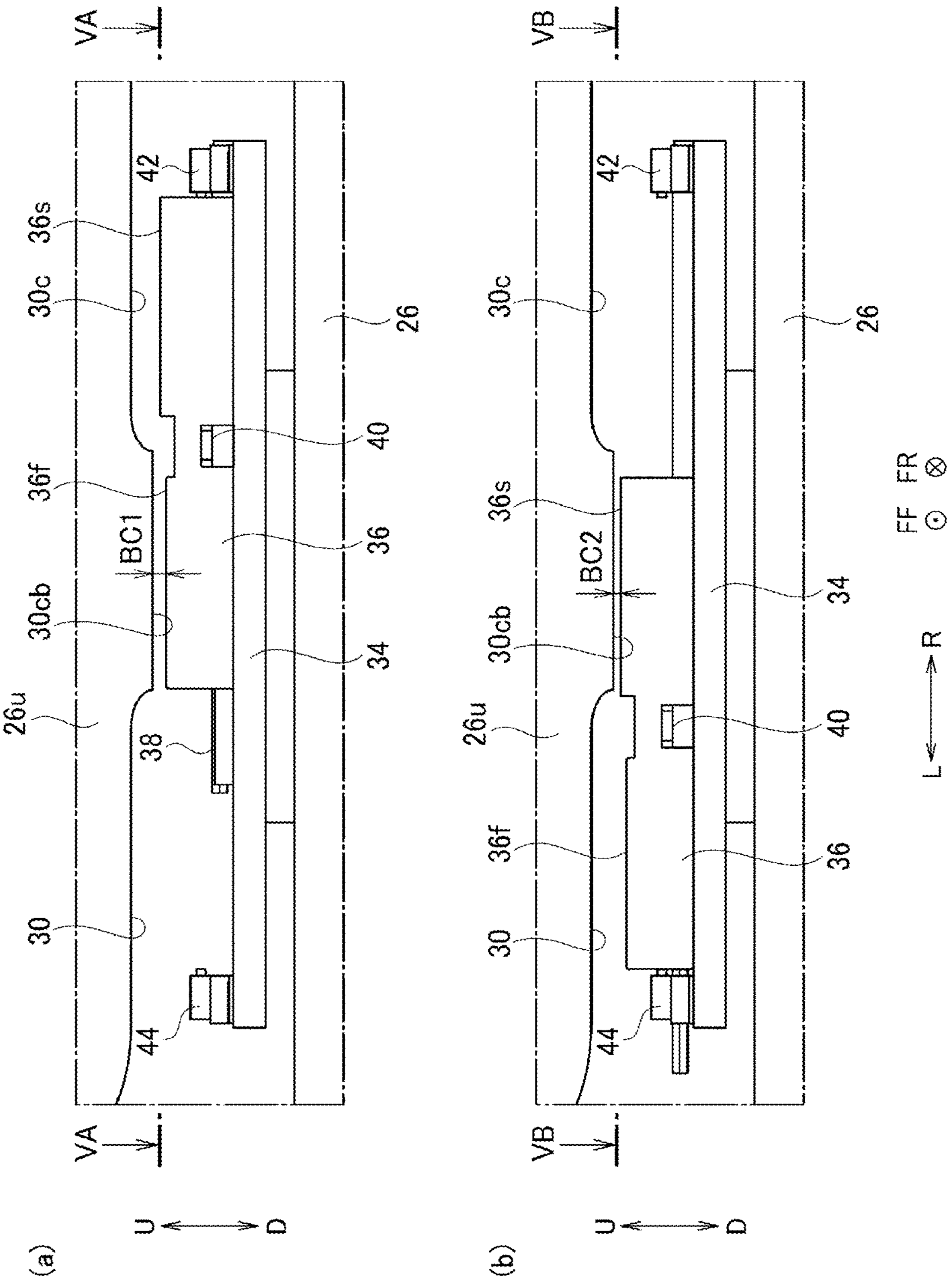
FIGS. 4(*a*) and 4(*b*) are enlarged views of an IV portion in FIG. 3, where FIG. 4(*a*) shows a first load-receiving state of a movable block and FIG. 4(*b*) shows a second load-receiving state of the movable block.
Figure 5A:
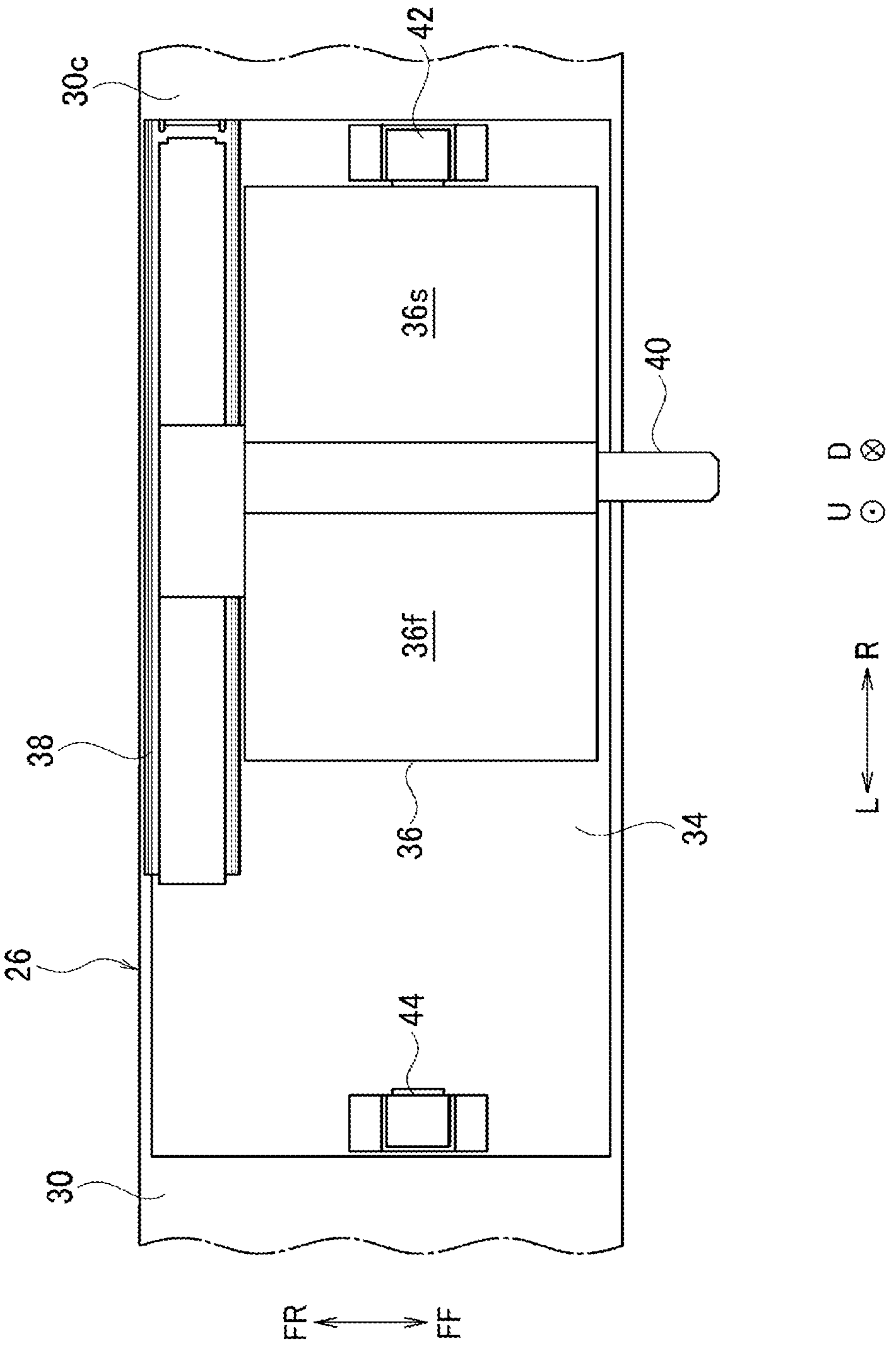
FIG. 5A is a plan view across a VA-VA line in FIG. 4(*a*).
Figure 5B:
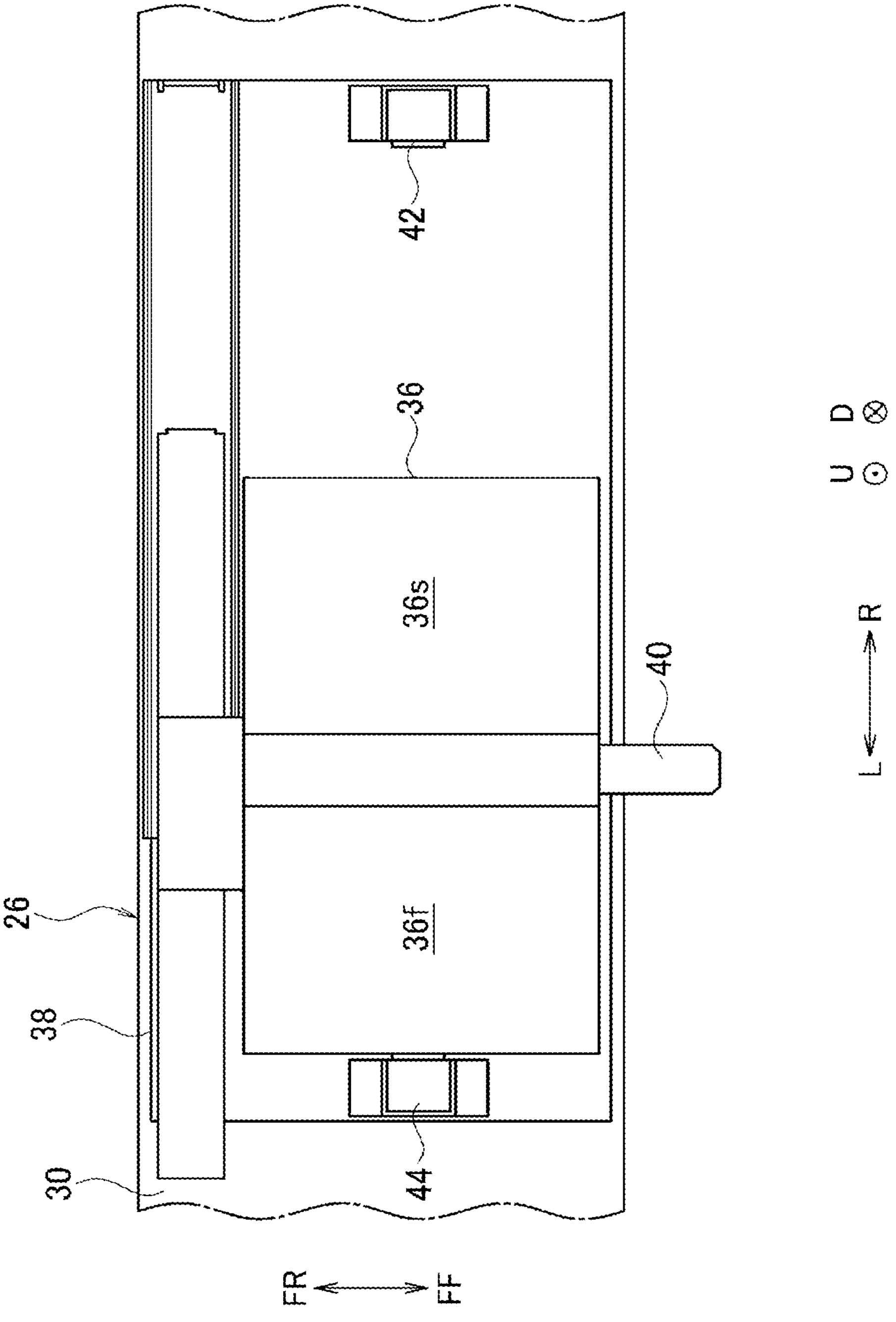
FIG. 5B is a plan view across a VB-VB line in FIG. 4(*b*).
Figure 6:
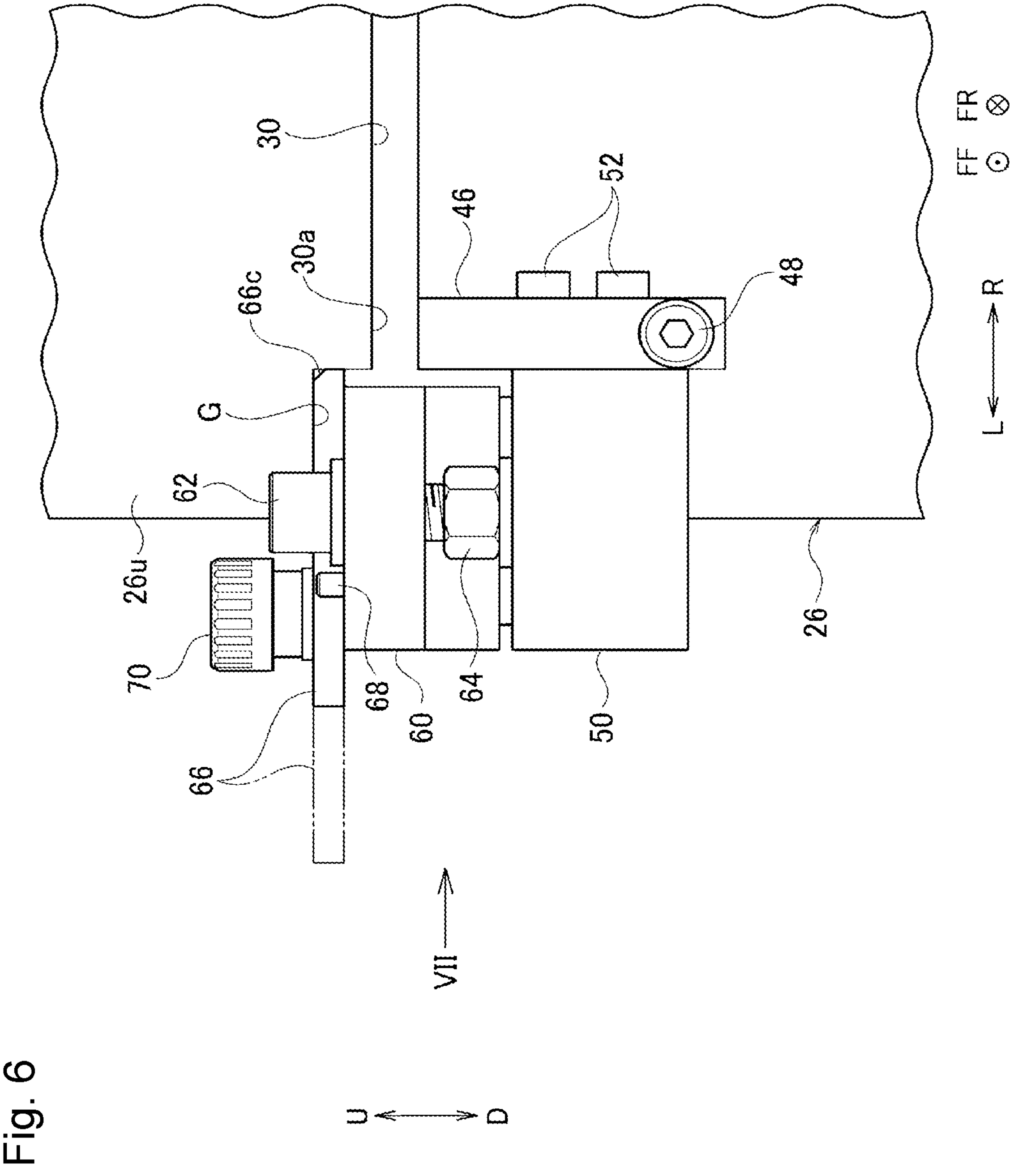
FIG. 6 is an enlarged view showing a VI portion in FIG. 3.
Figure 7:
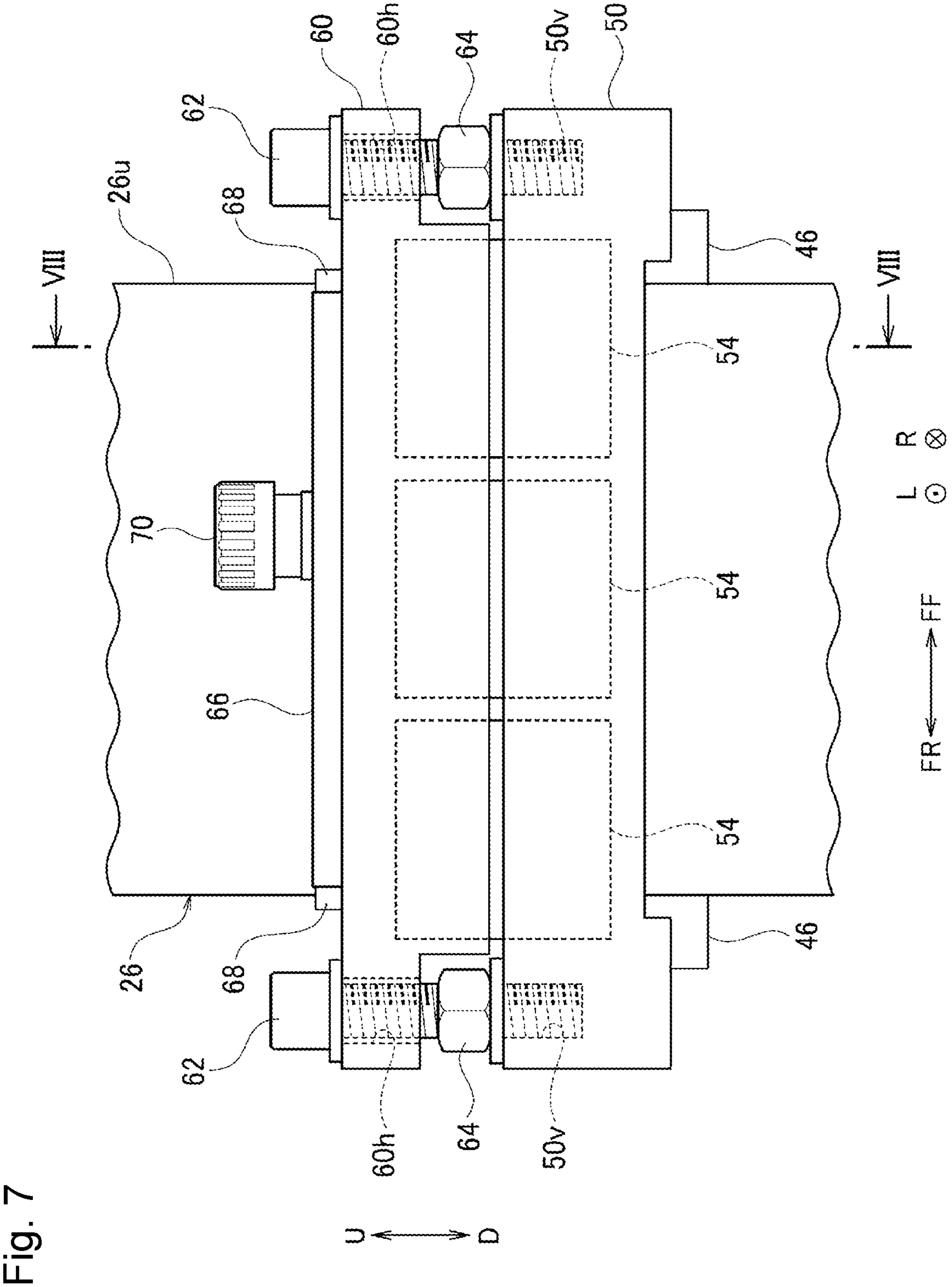
FIG. 7 is a side view showing a VII portion in FIG. 6.
Figure 8:
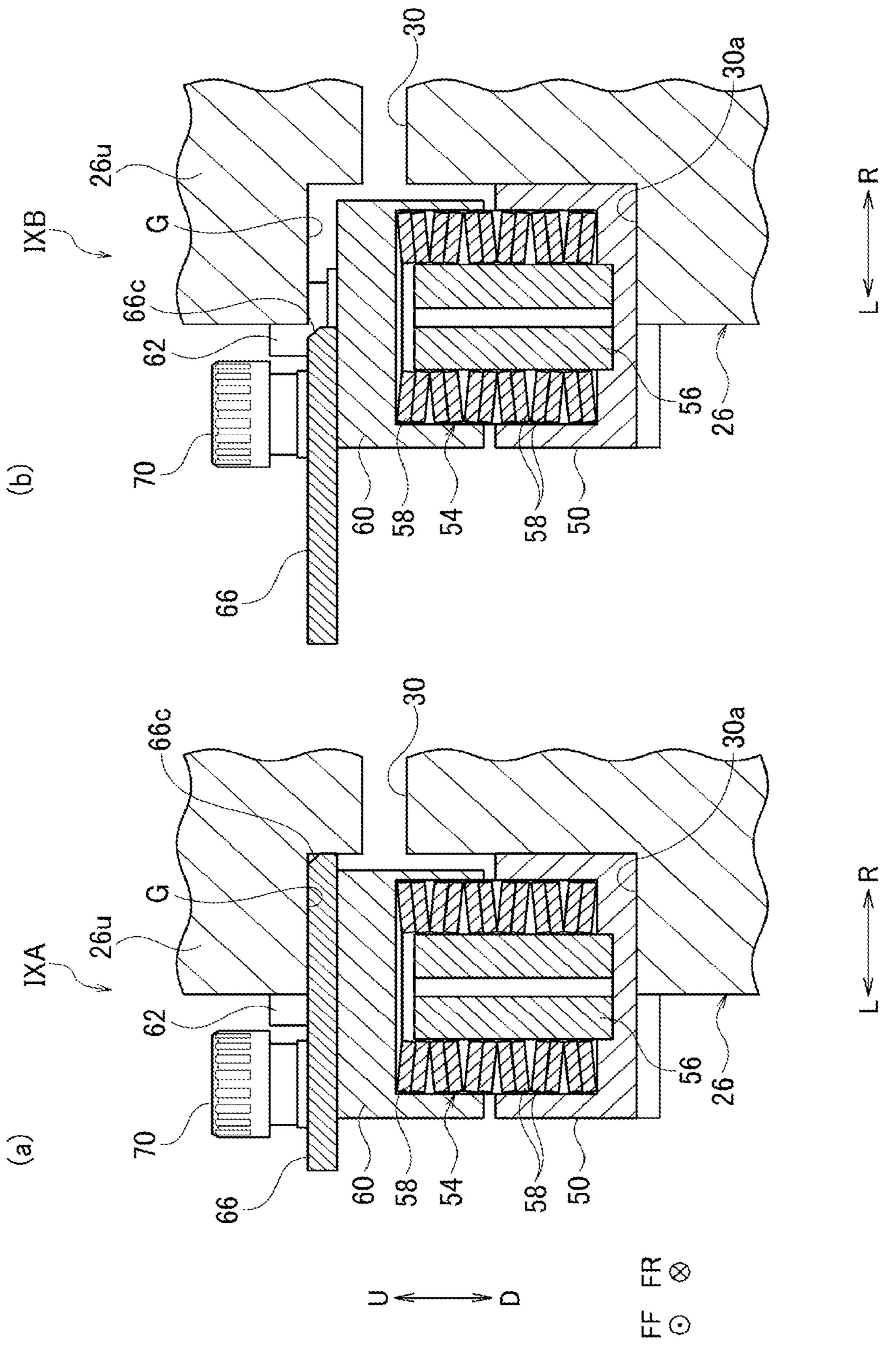
FIGS. 8(*a*) and 8(*b*) are cross-sectional views each taken along the line VIII-VIII in FIG. 7, where FIG. 8(*a*) shows a load-receiving state of an elastic member and FIG. 8(*b*) shows a released state of the elastic member.
Figure 9A:
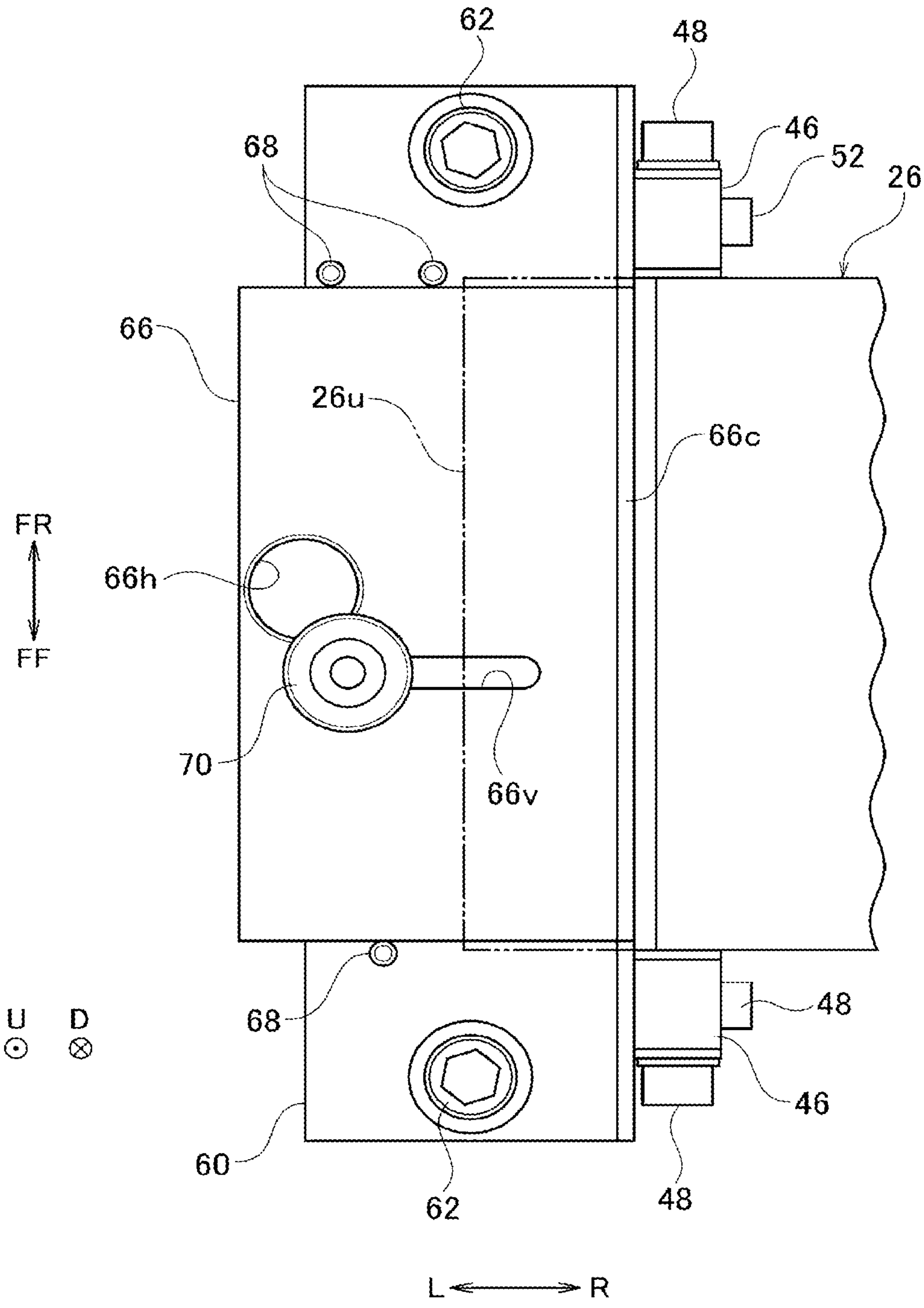
FIG. 9A is a plan view showing a IXA portion in FIG. 8(*a*).
Figure 9B:
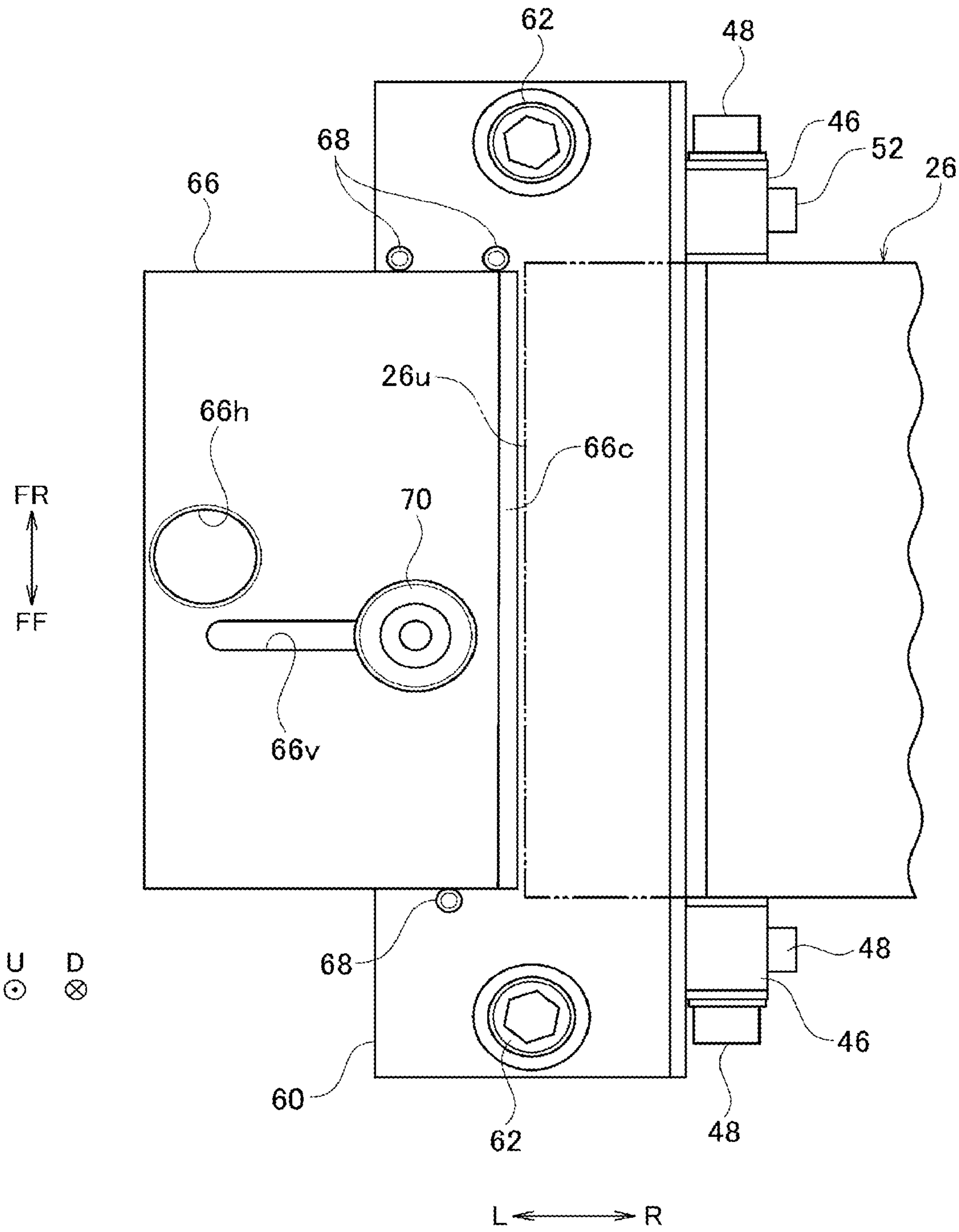
FIG. 9B is a plan view showing a IXB portion in FIG. 8(*b*).

As shown in FIGS. 4 to 5B, an operation lever 40 as an operation member for moving the movable block 36 in the lateral direction is provided on the front surface of the movable block 36. A first magnet 42 is provided on the inner side on the support base 34 in the lateral direction as a first state holding portion for keeping the movable block 36 in the first load-receiving state. The first magnet 42 can be magnetized on the side surface of the movable block 36. In the same manner, a second magnet 44 is provided on the outer side on the support base 34 in the lateral direction as a second state holding portion for keeping the movable block 36 in the second load-receiving state. The second magnet 44 can be magnetized on the side surface of the movable block 36.

Note that instead of the first magnet 42 and the second magnet 44, two operation actuators (not shown) may be used as the first state holding portion and the second state holding portion. Each operation actuator includes a shot pin (not shown) that can be engaged in an engaging hole (not shown) formed in the movable block 36.

As shown in FIGS. 3 and 6 to 8, a pair of brackets 46 are fixed to the outer end portions of the slit 30 (the outer horizontal portion 30*a*) in the lateral direction by means of fixing bolts 48. The respective brackets 46 are separated in the front-rear direction. A housing case 50 extending in the front-rear direction is fixed to the pair of brackets 46 by means of mounting bolts 52. The housing case 50 is located at the outer end portion of the slit 30 in the lateral direction. In other words, the housing case 50 is attached to the outer end portion of the slit 30 in the lateral direction via the pair of brackets 46 and the like.

A plurality of elastic members 54 that receive the bending load acting on the upper portion 26*u* are provided to the housing case 50 via a mounting shaft 56. The elastic members 54 are arranged along the front-rear direction. In other words, the housing case 50 houses the lower portions of the plurality of elastic members 54 lined in the front-rear direction. Each elastic member 54 is composed of a plurality of disc springs 58 laminated vertically, and can be elastically deformed in the vertical direction. Note that instead of the plurality of disc springs 58, a hard rubber such as an urethane rubber may be used as the elastic member 54.

On the upper side of the housing case 50, a cover member 60 that covers the upper parts of the elastic members 54 is provided so as to be vertically displaceable by means of a pair of fixing bolts 62 and a pair of fixing nuts 64. The cover member 60 extends in the front-rear direction. The fixing bolts 62 are inserted into insertion holes 60*h* formed in the front portion and the rear portion of the cover member 60, respectively, and their tips are screwed into screw holes 50*v* formed in the front portion and the rear portion of the housing case 50, respectively. The fixing bolts 62 are screwed into the fixing nuts 64 so as to fix the fixing bolts 62 to the housing case 50.

As shown in FIGS. 6 to 9B, a plate-shaped switching member 66 for switching the elastic member 54 between a load-receiving state and a released state is provided on the upper surface of the cover member 60. The switching member 66 is movable in the lateral direction, and the movement thereof is guided by three guide pins 68. The switching member 66 is inserted into or removed from a gap G between the upper inner wall of the outer end portion of the slit 30 in the lateral direction and an upper surface of the cover member 60, depending on the movement thereof in the lateral direction. The switching member 66 switches the elastic member 54 between the load-receiving state and the released state by the being inserted into the gap G and being separated from the gap G. In other words, the elastic member 54 is configured to be switchable between the load-receiving state and the released state depending on the movement of the switching member 66 in the lateral direction. The load-receiving state is a state in which the elastic member 54 receives the bending load acting on the upper portion 26*u* (see FIGS. 8(*a*) and 9A). The released state is a state in which the load-receiving state is released, and is a no-load-receiving state in which the elastic member 54 does not receive the bending load acting on the upper portion 26*u* (see FIGS. 8(*b*) and 9B).

A beveled portion 66*c* extending in the front-rear direction is formed on the inner side of the switching member 66 in the lateral direction. A finger hole 66*h* into which a finger of an operator is inserted is formed on the outer side of the switching member 66 in the lateral direction. An elongated hole 66*v* extending in the lateral direction is formed in the switching member 66. Further, a fixing screw member 70 for fixing the switching member 66 to the cover member 60 is screwed onto the upper surface of the cover member 60. The fixing screw member 70 is inserted through the elongated hole 66*v*. By tightening the fixing screw member 70, the switching member 66 is fixed to the cover member 60.

Subsequently, the operation (the bending method) of the punch press according to the present embodiment will be described. The bending method according to the present embodiment is a method of bending the workpiece W by the cooperation of the punch tool 12 and the die tool 14 with use of the press brake 10. Note that when the elastic member 54 is in the released state, the upper portion 26*u* of the lower table 26 is usually deflected downward, firstly at the both ends thereof that are easily deflected, as the bending load is increased. After that, the upper portion 26*u* comes into contact with the fixed block 32 and then comes into contact with the movable block 36 (the first load-receiving surface 36*f* or the second load-receiving surface 36*s*).

TABLE 1

| Type of workpiece | State of elastic member | State of movable block |
|---|---|---|
| Medium thickness plate | Released state | Second load-receiving state |
| Thin plate | Load-receiving state | First load-receiving state |
| Thick plate | Released state | First load-receiving state |

When the workpiece W of a medium thickness plate (thickness: 1.2 mm or more and less than 3.0 mm) is bent, as shown in Table 1 above, the elastic member 54 is put into the released state and the movable block 36 is put into the second load-receiving state. Specifically, when the medium thickness plate is bent and the bending length of the workpiece W is sufficiently longer than the total length of the lower table 26, the switching member 66 is moved to the outer side in the lateral direction so as to be separated from the gap G. As a result, the elastic member 54 is put into the released state. Further, the movable block 36 is moved to the outer side in the lateral direction so as to be put into the second load-receiving state.

Figure 10:
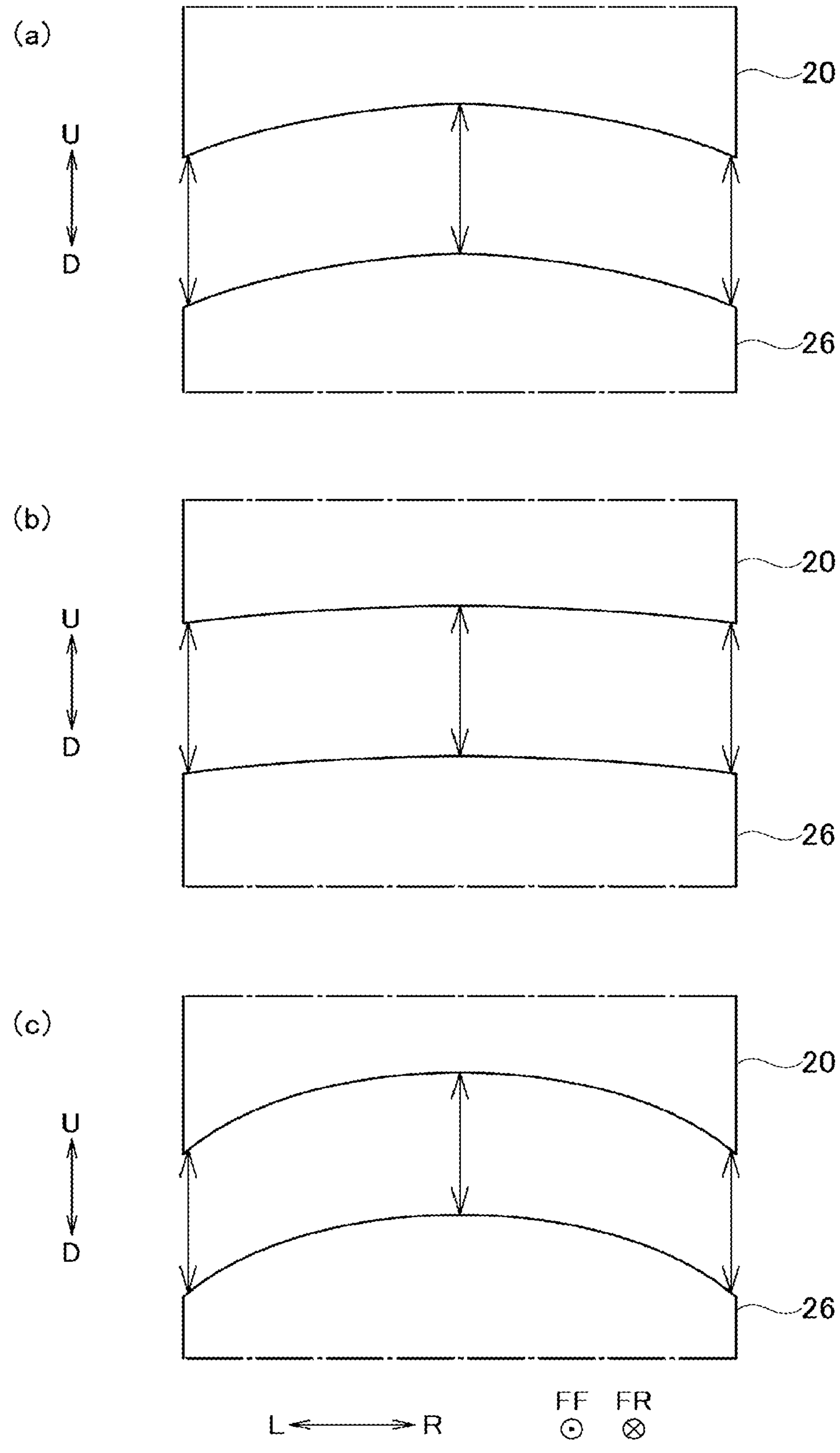
FIGS. 10(*a*), 10(*b*), and 10(*c*) are schematic views each showing a deflection state of the upper and lower tables, where FIG. 10(*a*) shows a case in which the medium thickness plate is bent, FIG. 10(*b*) shows a case in which the thin plate is bent, and FIG. 10(*c*) shows a case in which the thick plate is bent.

The elastic member 54 is provided to suppress the deflection at the both ends of the lower table 26 when a thin plate having a long bending length is bent. Therefore, when the medium thickness plate is bent, the elastic member 54 is not required and thus put into the released state. When the medium thickness plate is bent, the bending load thereof is smaller than the bending load in the case of the thick plate. As a result, the deflection of the upper table 20 is smaller than the deflection in the case of the thick plate. In order to adjust the deflection of the lower table 26 in accordance with the deflection of the upper table 20, the movable block 36 is put into the second load-receiving state so that the clearance from the upper portion 26*u* of the lower table 26 is smaller (the second clearance BC2). As a result, as shown in FIG. 10(*a*), the closing interval (the vertical interval) between the upper table 20 and the lower table 26 can be made substantially uniform along the lateral direction, thereby making it possible to improve the longitudinal accuracy.

Note that when the medium thickness plate is bent and the bending length of the workpiece W is sufficiently shorter than the total length of the lower table 26, the elastic member 54 is put into the released state and the movable block 36 is put into the second load-receiving state as in the case in which the bending length of the workpiece W is long. (Detailed descriptions will be given later of the case in which the bending length of the workpiece W is sufficiently short, in addition to the case of the thin plate and the thick plate.)

When the workpiece W of a thin plate (thickness: less than 1.2 mm) is bent, as shown in Table 1 above, the elastic member 54 is put into the load-receiving state and the movable block 36 is put into the first load-receiving state, as necessary. Specifically, when the thin plate is bent and the bending length of the workpiece W is slightly shorter than or substantially the same as the total length of the lower table 26, the switching member 66 is moved to the inner side in the lateral direction so as to be inserted into the gap G. As a result, the elastic member 54 is put into the load-receiving state. Further, the movable block 36 is moved to the inner side in the lateral direction so as to be put into the first load-receiving state.

Since the elastic member 54 is provided to suppress the deflection at the both ends of the lower table 26 when a thin plate having a long bending length is bent, the elastic member 54 is put into the load-receiving state so as to be utilized for this purpose. In this case, since the bending load is also relatively small, the deflection of the lower table 26 is small and thus the movable block 36 is not involved in the bending. Therefore, the elastic member 54 may be in the first receiving state or the second receiving state. In the present embodiment, in order to safely eliminate the involvement of the movable block 36, the movable block 36 is put into the first load-receiving state in which the clearance from the upper portion 26*u* of the lower table 26 is large. As a result, as shown in FIG. 10(*b*), the closing interval between the upper table 20 and the lower table 26 can be made substantially uniform along the lateral direction, thereby making it possible to improve the longitudinal accuracy.

When a thin plate having a long bending length is bent, the deflection of the lower table 26 is controlled by the elastic member 54. Here, the upper portion 26*u* of the lower table 26 may or may not come into contact with the fixed block 32, depending on the bending load (the thickness of the thin plate). Further, even in the case of the thin plate, the bending load will change if the thickness thereof changes. In the present embodiment, the lower table 26 are elastically supported from below at the both ends thereof by the elastic member 54. Therefore, the deflection of the lower table 26 is variably adjusted in accordance with the thickness, that is, a relatively small bending load. As a result, the longitudinal accuracy is improved.

Note that even when the thin plate is bent, if the bending length of the workpiece W is sufficiently shorter than the total length of the lower table 26, the elastic member 54 is put into the released state and the movable block 36 is put into the second load-receiving state.

When the workpiece W of a thick plate (thickness: 3 mm or more) is bent, the elastic member 54 is put into the released state and the movable block 36 is put into the first load-receiving state. Specifically, when the thick plate is bent and the bending length of the workpiece W is slightly shorter than or substantially the same as the total length of the lower table 26, the switching member 66 is moved to the outer side in the lateral direction so as to be separated from the gap G. As a result, the elastic member 54 is put into the released state. Further, the movable block 36 is moved to the inner side in the lateral direction so as to be put into the first load-receiving state.

As described above, even when the thick plate is bent, the elastic member 54 is not required and thus put into the released state. When the thick plate is bent, the bending load thereof is larger than the bending load in the case of the medium thickness plate. As a result, the deflection of the upper table 20 is larger than the deflection in the case of the medium thickness plate. In order to adjust the deflection of the lower table 26 in accordance with the deflection of the upper table 20, the movable block 36 is put into the first load-receiving state so that the clearance from the upper portion 26*u* of the lower table 26 is larger (the first clearance BC1). As a result, as shown in FIG. 10(*c*), the closing interval between the upper table 20 and the lower table 26 can be made substantially uniform along the lateral direction, thereby making it possible to improve the longitudinal accuracy.

Note that even when the thick plate is bent, if the bending length of the workpiece W is sufficiently shorter than the total length of the lower table 26, the elastic member 54 is put into the released state and the movable block 36 is put into the second load-receiving state.

That is, when the bending length of the workpiece is short, the bending is performed at the center of the upper table 20 and the lower table 26. As a result, it is not necessary to suppress the deflection at the both ends of the lower table 26 by means of the elastic member 54. Therefore, when the bending length of the workpiece is short, the elastic member 54 is put into the released state for all of the thin plate, the medium thickness plate, and the thick plate. Further, when the bending length of the workpiece is short, it is not necessary to significantly deflect the lower table 26. Therefore, when the bending length of the workpiece is short, the movable block 36 is put into the second load-receiving state for all of the thin plate, the medium thickness plate, and the thick plate. As a result, the workpiece is stably bent at the center of the upper table 20 and the lower table 26.

As described above, in the present embodiment, the elastic members 54 are provided at the respective end portions on the outer side of the slit 30 in the lateral direction. The elastic member 54 is configured to be switchable between the load-receiving state for receiving the bending load acting on the lower table 26 (FIG. 8(*a*)) and the released state in which the load-receiving state is released (FIG. 8(*b*)). Therefore, by switching the elastic member 54 in accordance with the thickness and the bending length of the workpiece, the closing interval between the upper table 20 and the lower table 26 can be made substantially uniform along the lateral direction in any combination of the thin plate, the medium thickness plate, the thick plate, and short and long lengths of the bending length. Particularly, by putting the elastic member 54 into the load-receiving state, it is possible to improve the longitudinal accuracy of the thin plate having a long bending length. In other words, regardless of the thickness and the bending length of the workpiece W, the longitudinal accuracy of the bending can be sufficiently improved.

Further, in the present embodiment, the movable block 36 is provided at the inner part of the slit 30. By switching the clearances (the first and second clearances) from the inner surface of the slit by means of the movable block under the released state of the elastic member 54, the deflection of the lower table 26 can be adjusted, thereby making it possible to improve the longitudinal accuracy of the medium thickness plate and the thick plate each having a long bending length.

Further, since the press brake 10 is provided with the switching member 66 for switching the elastic member 54 between the load-receiving state and the released state, the elastic member 54 can be easily switched.

Here, the press brake 10 is further provided with the housing case 50 for housing the elastic member 54 and the cover member 60 for covering the upper part of the elastic member 54. The housing case 50 and the cover member 60 can be attached to the press brake 10 so that the elastic member 54 can be easily switched by the housing case 50 and the cover member 60. Further, with this configuration, the elastic member 54 can be easily replaced.

Further, the cover member 60 is configured to be vertically displaceable with respect to the housing case 50. Therefore, in accordance with the elastic deformation of the elastic member 54 in the load-receiving state, the cover member 60 and the switching member 66 arranged above the elastic member 54 can be vertically displaced so as to reliably adjust the deflection of the lower table 26.

Figure 1:
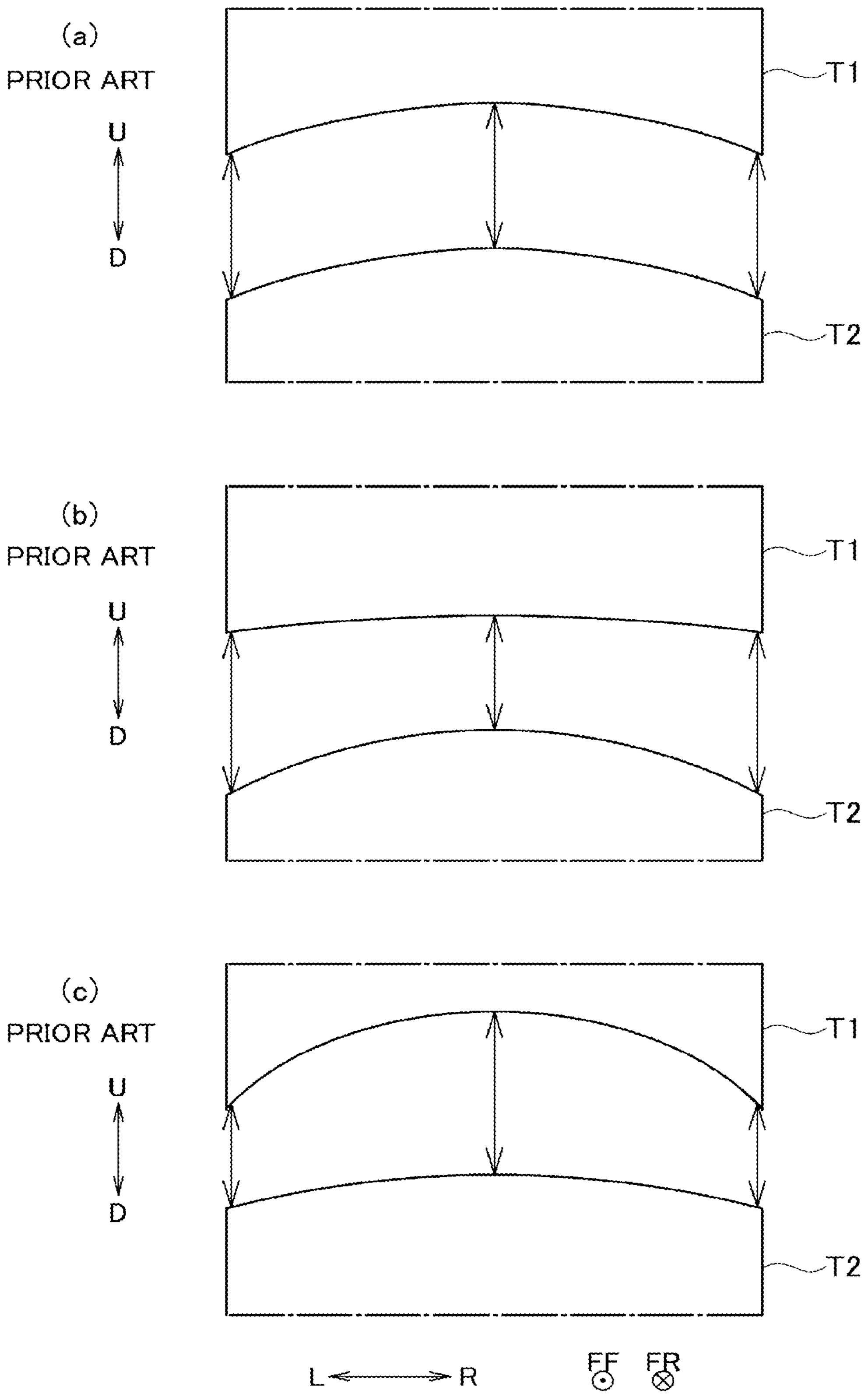
FIGS. 1(*a*), 1(*b*), and 1(*c*) are schematic views each showing a deflection state of an upper and lower tables in a press brake disclosed in Patent Literature 1.

Note that the deflection of the upper table and the lower table in FIGS. 1 and 10 are shown in an emphasized manner. In reality, the downward displacement due to the deflection at the both ends of the lower table is several millimeters, and the thickness of the switching member 66 described above is also about several millimeters.

The present invention is not limited to the description of the embodiments described above, and can be implemented in various aspects by making appropriate changes. Then, the scope of rights included in the present invention is not limited to the description of the embodiments described above.

The entire contents of Japanese Patent Application No. 2020-24127 (filed on Feb. 17, 2020) are incorporated herein by reference. Although the present invention has been described above by reference to the embodiments of the present invention, the present invention is not limited to the embodiments described above. The scope of the present invention is determined in light of the claims.

The invention claimed is:

1. A press brake, comprising:

an upper table provided so as to be vertically movable at an upper part of a main frame and configured to hold a punch tool on a lower side thereof;

a lower table provided at a lower part of the main frame and including a pair of slits formed therein, the pair of slits extending symmetrically in a lateral direction, an end portion of each of the slits on an outer side in the lateral direction being opened, the lower table being configured to hold a die tool on an upper side thereof;

an elastic member provided at the end portion of each of the slits on the outer side in the lateral direction and configured to be switchable between a load-receiving state for receiving a bending load acting on the lower table at a time of bending and a released state in which the load-receiving state is released at the time of bending;

a switching member configured to switch the elastic member between the load-receiving state and the released state;

a housing case provided at the end portion of each of the slits on the outer side in the lateral direction and configured to house the elastic member; and a cover member provided on an upper side of the housing case and configured to cover an upper part of the elastic member, wherein the elastic member is put into the load-receiving stage when the switching member is inserted into a gap between an upper inner wall of the end portion of each of the slits on the outer side in the lateral direction and an upper surface of the cover member, and the elastic member is put into the released state when the switching member is separated from the gap.

2. The press brake according to claim 1, further comprising a movable block provided on an inner portion of each of the slits and movable in the lateral direction, wherein the movable block includes a pair of a first load-receiving surface and a second load-receiving surface lined in the lateral direction to receive the bending load, and the movable block is configured to be switchable between a first load-receiving state and a second load-receiving state, the first load-receiving surface vertically facing an inner surface of the slit with a first clearance in the first load-receiving state, the second load-receiving surface vertically facing the inner surface of the slit with a second clearance smaller than the first clearance in the second load-receiving state.

3. The press brake according to claim 1, wherein the cover member is configured to be vertically displaceable with respect to the housing case.

4. A bending method for bending a workpiece by cooperation between a punch tool and a die tool with use of the press brake according to claim 2, the bending method comprising when a workpiece of a thin plate having a thickness of less than 1.2 mm is bent, putting the elastic member into the load-receiving state and putting the movable block into the first load-receiving state, as necessary.

5. The bending method according to claim 4, further comprising, when a workpiece of a thick plate having a thickness of 3 mm or more is bent, putting the elastic member into the released state and putting the movable block into the first load-receiving state.

6. The bending method according to claim 4, further comprising, when a workpiece of a medium thickness plate having a thickness of 1.2 mm or more and less than 3 mm is bent, putting the elastic member into the released state and putting the movable block into the second load-receiving state.

* * * * *